US009519369B2

(12) United States Patent
Huck (10) Patent No.: US 9,519,369 B2
(45) Date of Patent: Dec. 13, 2016

(54) TOUCH SCREEN SELECTION (75) Inventor: Jerome Huck, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 146 days.

(21) Appl. No.: 14/112,063

(22) PCT Filed: Apr. 19, 2011

(86) PCT No.: PCT/US2011/032968
§ 371 (c)(1),
(2), (4) Date: Oct. 16, 2013

(87) PCT Pub. No.: WO2012/144984
PCT Pub. Date: Oct. 26, 2012

(65) Prior Publication Data
US 2014/0049499 A1   Feb. 20, 2014

(51) Int. Cl.
*G06F 3/041* (2006.01)
*G06F 3/0484* (2013.01)
*G06F 3/0488* (2013.01)

(52) U.S. Cl.
CPC .......... *G06F 3/0412* (2013.01); *G06F 3/0416* (2013.01); *G06F 3/0488* (2013.01); *G06F 3/04842* (2013.01); *G06F 2203/04805* (2013.01)

(58) Field of Classification Search
None
See application file for complete search history.

(56) References Cited

U.S. PATENT DOCUMENTS

| 7,692,629 | B2 | 4/2010 | Baudisch et al. | |
| 7,760,187 | B2 | 7/2010 | Kennedy | |
| 2006/0059437 | A1 | 3/2006 | Conklin, III | |
| 2007/0013722 | A1* | 1/2007 | Souza | 345/660 |
| 2007/0198950 | A1* | 8/2007 | Dodge et al. | 715/815 |

(Continued)

FOREIGN PATENT DOCUMENTS

| CN | 101430632 | 5/2009 |
| CN | 101553775 A | 10/2009 |

(Continued)

OTHER PUBLICATIONS

International Searching Authority, Appl No. PCT/US2011/032968, filed Apr. 19, 2011, Search Report and Written Opinion dated Dec. 28, 2011.

(Continued)

*Primary Examiner* — Amare Mengistu
*Assistant Examiner* — Joseph G Rodriguez
(74) *Attorney, Agent, or Firm* — HP Inc Patent Department (57) ABSTRACT

Example embodiments disclosed herein relate to touch screen selection. A device displays a plurality of touch elements on a touch-enabled display. The device receives a touch input via the touch-enabled display. Further, the device determines an ambiguity based on the touch selection input. The device magnifies an area associated with the touch selection input based on the ambiguity determination. Moreover, the area includes a set of the touch elements associated with the ambiguity termination. The device receives another touch input at the area via the touch-enabled display. Then, the device determines one of the touch elements based on the other touch input.

18 Claims, 7 Drawing Sheets

(56) References Cited

U.S. PATENT DOCUMENTS

2008/0136785 A1* 6/2008 Baudisch .............. G06F 3/0488
                                                              345/173
2009/0064047 A1    3/2009 Shim et al.
2009/0231285 A1    9/2009 Duncan et al.
2010/0066694 A1    3/2010 Jonsdottir
2010/0077304 A1    3/2010 Zaman et al.
2010/0257478 A1   10/2010 Longe et al.
2011/0181522 A1*   7/2011 Rendahl ........................ 345/173

FOREIGN PATENT DOCUMENTS

CN     101814002 A    8/2010
CN     101968711      2/2011
WO     WO-2008/070815 A1    6/2008

OTHER PUBLICATIONS

Tomer Moscovich, "Contact Area Interaction with Sliding Widgets," Oct. 4-7, 2009. Microsoft Research-INRIA Joint Centre, Orsay. France, Available at: <moscovich.net/tomer/papers/moscovich-sliding-uist09.pdf>.

Extended European Search Report, EP Application No. 11863932.7, Date issued: Nov. 18, 2014, pp. 1-4.

The International Bureau of WIPO, International Preliminary Report on Patentability for PCT/US2011/032968 dated Oct. 31, 2013 (6 pages).

* cited by examiner

TOUCH SCREEN SELECTION

CROSS-REFERENCE TO RELATED APPLICATION

This application is a national stage application under 35 U.S.C. §371 of PCT/US2011/032968, filed Apr. 19, 2011.

BACKGROUND

Service providers and device manufacturers are challenged to deliver quality and value to consumers, for example by providing innovative user interfaces to customers. The use of touch screen devices is growing around the world. The development of such touch screen devices generates various technical challenges for manufacturers and service providers. For example, user interfaces that are useful in desktop computing situations can be inadequate for touch screen devices.

BRIEF DESCRIPTION OF THE DRAWINGS

The following detailed description references the drawings, wherein.

DETAILED DESCRIPTION

Touch screen devices are growing as a mechanism to provide content to users. The number of individuals utilizing touch screen devices, such as smart phones and tablet computing devices is continually growing. Various user interfaces are utilized to provide content via these touch screen devices. However, many user interfaces utilized on such devices may be inadequate to provide a complete user experience.

For example, a user's finger is a common input for touch screen devices; however a finger is sometimes too large to unambiguously select a user interface element presented on a touch screen display. Touch screens in mobile phones and other devices were created to be portable, with smaller screens. As such, the touch screens on these devices can be too small to recognize an intended selection of a user interface element. For example, touch screen selection of one or more selection elements such as soft keypads, links, text boxes, selection boxes, content creation elements, etc. can be a problem when a finger touch spans multiple elements or are close to other elements, which makes the device unsure about which selection element was intended. A further challenge in touch screen selection is to provide an enhanced selection user interface that is intuitive for a user.

Accordingly, various embodiments disclosed herein relate to enabling touch screen selection of interface elements via auto magnification. The auto magnification can be utilized when an ambiguity in a touch selection of interface elements is determined. The device then magnifies an area associated with a touch location based on the determination that there is ambiguity in what the selection refers to.

Auto magnification can be utilized to provide a seamless user experience to a user. Magnifying a particular area directly presents the same user interface to the user. As such, the user can easily use the magnified area in the same way as the previously presented user interface. Thus, the user may be able to quickly determine that the same touch mechanism can be used to select the element presented on the screen. The user can then touch the magnified area of the screen to select the element. When the element is selected, a task based on the selection can be performed.

Tasks can vary based on a type of selection element. In one example, a task for a hyperlink can be to follow the link in a web browser. In another example, a task for a list selection element can be to expand a list associated with the list selection element. In this example, the auto magnification can be set to automatically de-magnify the area to return the user interface to the previous view before expanding the list.

Figure 1:
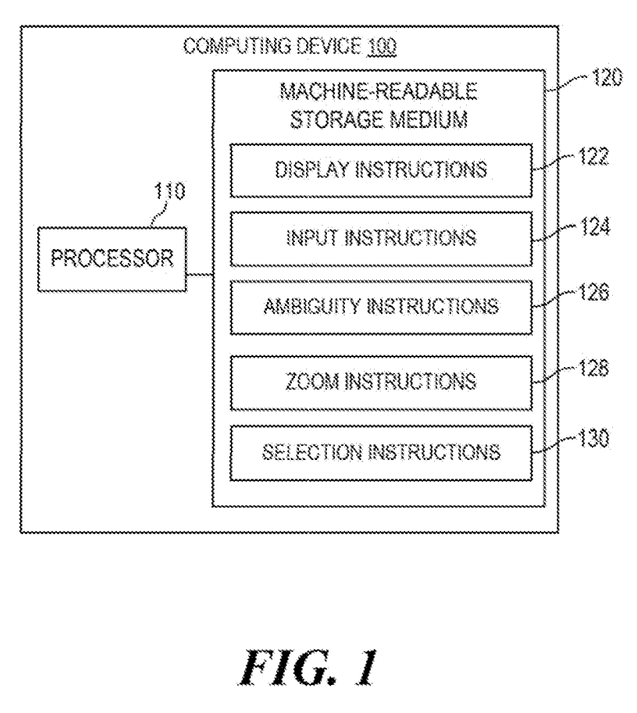
FIG. 1 is a block diagram of a computing device utilizing a user interface for touch screen selection, according to one example.

Referring now to the drawings, FIG. 1 is a block diagram of a computing device utilizing a user interface for touch screen selection, according to one example. The computing device 100 includes, for example, a processor 110, and a machine-readable storage medium 120 including instructions 122, 124, 126, 128, 130 for touch screen selection based on automatic magnification. Computing device 100 may be, for example, a notebook computer, a slate or tablet computing device, a portable reading device, a wireless email device, a mobile phone, or any other computing device with a touch-enabled screen.

Processor 110 may be, at least one central processing unit (CPU), at least one semiconductor-based microprocessor, at least one graphics processing unit (GPU), other hardware devices suitable for retrieval and execution of instructions stored in machine-readable storage medium 120, or combinations thereof. For example, the processor 110 may include multiple cores on a chip, include multiple cores across multiple chips, multiple cores across multiple devices (e.g., if the computing device 100 includes multiple node devices), or combinations thereof. Processor 110 may fetch, decode, and execute instructions 122-130 to implement touch selection based on auto magnification, for example via the processes of FIGS. 3-6. As an alternative or in addition to retrieving and executing instructions, processor 110 may include at least one integrated circuit (IC), other control logic, other electronic circuits, or combinations thereof that include a number of electronic components for performing the functionality of instructions 122-130.

Machine-readable storage medium 120 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 120 can be non-transitory. As described in detail below, machine-readable storage medium 120 may be encoded with a series of executable instructions for selecting touch elements on a touch-enabled display. In certain embodiments, a touch element is a portion of a presented user interface on a touch-enabled display that is activated when a touch input is determined to be associated portion. Examples of touch elements include links (e.g., web links to other web pages, links embedded in icons or images, etc.), menu items (e.g., menu bars, file menus, toolbars, etc.), fields (e.g., a search input area, a text area, etc.), and movable user interface components (e.g., a window, a pointer, a drawing tool, etc.).

The computing device 100 can utilize a touch-enabled display to present graphical information. In certain embodiments, a touch-enabled display is a visual display that can detect the presence and location of a touch with an area of the display. Various technologies can be utilized to implement the display, for example, resistive technology, capacitive technology, infrared technology, etc. The processor 110 can cause presentation of graphical information by transmitting the information to the display.

The computing device 100 can provide user interfaces on the touch-enabled display by executing programs (e.g., an operating system, an application, etc.). As such, display instructions 122 can be executed to cause display of a plurality of touch elements on the touch-enabled display. The touch elements may be presented on the touch-enabled display as part of a user interface being presented by one or more of the programs. As previously noted, the touch elements can correspond to portions of the display that can be activated. Some touch elements may be displayed close together.

An input can be received by the processor 110 indicating that a portion of the screen has been touched. The portion can be considered a blot area. In certain embodiments, a blot area is the part of the touch-enabled display that is activated by the touch. The input instructions 124 are executed by the processor 110 to determine an action to take based on the input. The input can be received as a geometric set of points or a description of an area of the display touched. The processor 110 can map the blot area to locations of touch elements being displayed. As such, the processor 110 can determine if the blot area corresponds to one or more of the touch elements. In certain cases, this determination is unambiguous (e.g., only one touch element is in the blot area). In other cases, the determination may be ambiguous.

The processor 110 can execute ambiguity instructions 126 to determine whether the touch input is ambiguous in selecting one of the touch elements. As such, the processor 110 determines what touch elements are nearby the blot area. If no touch element or only one touch element is within the blot area, the input is unambiguous. If multiple touch elements can be associated with the blot area the processor 110 determines a confidence level of how likely the touch is to correspond to a particular touch element. Different touch elements can have different criteria to determine the confidence level.

In one example, a first touch element is completely encompassed by the blot area while the other touch elements are minimally overlapping with the blot area. The processor 110 can determine that the first touch element is selected unambiguously.

In another example, a first touch element and a second touch element are completely or partially encompassed by the blot area. The processor 110 determines that there is an ambiguity as to which touch element was selected. Such ambiguity can be determined based on more than two touch elements. As such, the processor 110 determines that the blot area is ambiguous in determining one of the touch elements. Further, the processor 110 may determine that a set of the touch elements, which can include the first touch element and the second touch element, may be selected based on the blot area. For example, the set can include touch elements that have a certain confidence level that they may be selected by the touch input.

If the processor 110 determines that there is an ambiguity, the processor 110 executes zoom instructions 128. Zoom instructions 128 can be utilized to determine to zoom in onto a region of interest surrounding the blot area. This can occur automatically based on the ambiguity determination. The zooming can fill the entire display or can fill a portion of the display (e.g., as a callout). Further, the zoomed in region can maintain scaled spacing of the region. For example, the zooming in can be a magnification by a particular scale (e.g., a 2× zoom, a 1.5× zoom, a 4× zoom, etc.) and retain scaled spatial relationships during the zoom. The maintenance of the spatial relationships and the zooming in of the region provides a large surface for the user to select the touch element. Further, the zoomed in region provides an intuitive user interface to the user because the user need not learn a new manner to interact with the region. That is because the user interface of the region interacts in the same manner as the non-zoomed in user interface.

In certain scenarios, the scale of the zooming can be determined based on spacing information between touch elements, the size of the touch elements, the size of the blot, or combinations thereof. The scale can be based on a function utilized to zoom in to a level where the blot area can unambiguously select one of the touch elements for which the ambiguity was detected. For example, the zooming can be executed in a manner in which the size of one of the touch elements (e.g., the smallest touch element, the largest touch element, etc.) is at least a certain percentage of the size of the blot. As such, the zoom instructions 128 can cause the processor 110 to examine the nearby touch elements to attempt to spread them apart in the zoomed in image to allow a subsequent user touch (creating a new blot) to uniquely specify the intended touch element. Moreover, the zooming can be based on a user profile. The user profile can determine individual parameters that can be utilized in determining the zoom level. For example, the user profile can include information about blot sizes generated by the user, which may include blot sizes for one or more fingers used by the user. With this approach, a processed blot size associated with the user and/or other tendencies of the user can be used to determine the zoom level.

Once the region is zoomed in on, the computing device 100 may receive another touch input to select a touch element via the touch-enabled display. The processor 110 can determine another blot area associated with the other touch input. Selection instructions 130 can then be utilized to determine one of the touch elements based on the other blot area. The other touch input can also go through the ambiguity determination. In this manner, if the other touch input is determined to be ambiguous, a portion of the region can be zoomed in on.

Figure 2A:
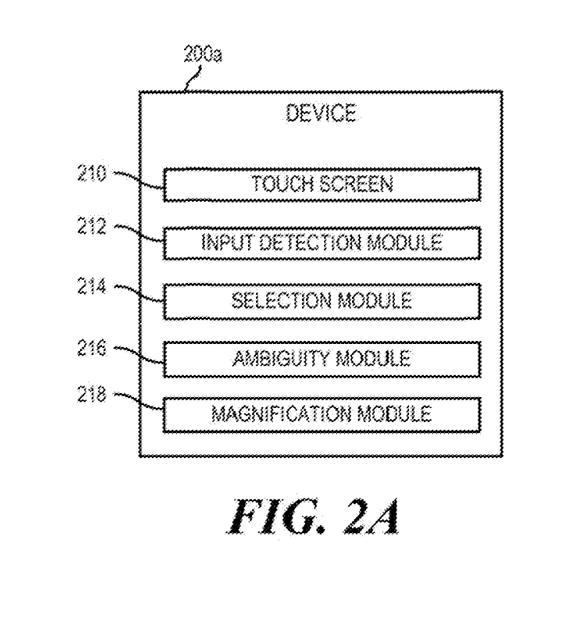
FIGS. 2A and 2B are block diagrams of devices for providing touch screen user interface, according to various examples.
Figure 2B:
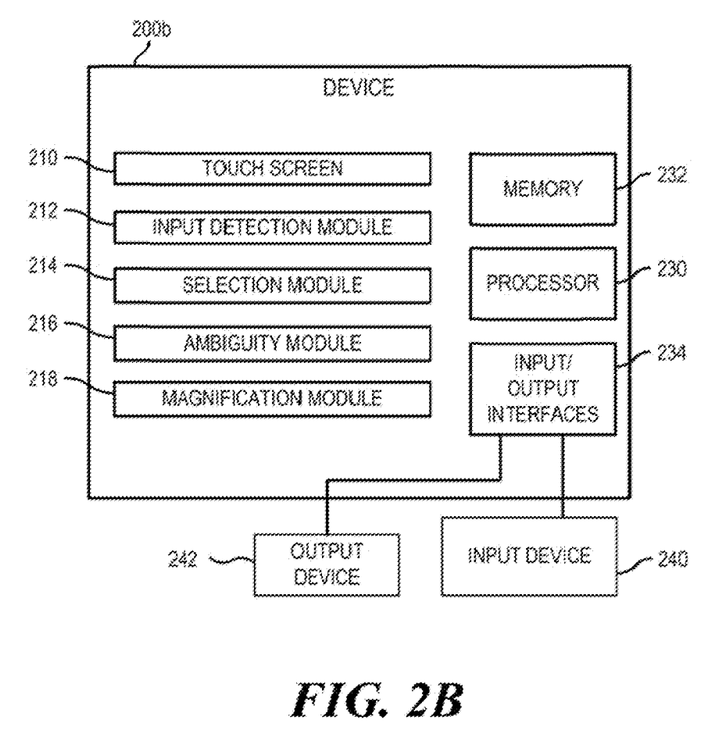

FIGS. 2A and 2B are block diagrams of devices for providing a touch screen user interface, according to various examples. Devices 200a, 200b include modules that can be utilized to magnify a region of interest to select touch elements. The respective devices 200a, 200b may be a notebook computer, a tablet computing device, a portable reading device, a wireless device, a mobile phone, a server or any other device that may be utilized to present touch screen user interface elements. The devices 200a, 200b can include a touch-enabled display, such as a touch screen 210 to present information, such as multiple touch elements, to a user. The touch screen 210 can be connected via one or more interfaces (e.g., via a cable or a wireless medium). A processor, such as a CPU, a GPU, or a microprocessor suitable for retrieval and execution of instructions and/or electronic circuits can be configured to perform the functionality of any of the modules 212-218 described below. In some embodiments, the devices 200a, 200b can include some of the modules (e.g., modules 212-218), the touch screen 210, and/or additional components. Further, in certain embodiments, some modules can be utilized to implement functionality of other modules described below.

As detailed below, devices 200a, 200b may include a series of modules 212-218 for utilizing a touch screen user interface during use of one or more applications executing on the devices 200a, 200b. Each of the modules 212-218 may include, for example, hardware devices including electronic circuitry for implementing the functionality described below. In addition or as an alternative, each module may be implemented as a series of instructions encoded on a machine-readable storage medium of respective devices 200a, 200b and executable by a processor. It should be noted that, in some embodiments, some modules 212-218 are implemented as hardware devices, while other modules are implemented as executable instructions.

The touch screen 210 can be utilized to present interfaces to users. These interfaces can be part of a program (e.g., an operating system, an application, a game, etc.) executed by a processor 230 and stored in memory 232 of the device 200b. The touch screen 210 can further be utilized as an input source. The input detection module 212 can determine touch input from the touch screen 210. The input detection module 212 can further utilize a coordinate system to associate a touch input via the touch screen 210 with a portion of the screen. The portion of the screen can be considered a blot area. As such, the touch input can be associated with one or more points of the screen.

A selection module 214 attempts to determine what the touch input is attempting to activate and/or utilize. In certain scenarios, the touch elements can be options for what can be activated by the touch input. When touch input is received, the selection module 214 and/or the ambiguity module 216 can determine whether the touch input is ambiguous in selecting one of the touch elements. The touch input can be considered ambiguous if more than one of the touch elements could be selected. Thus, if ambiguous, the touch input can be considered to be open to being associated with more than one of the touch elements. If the input is unambiguous, the selection module 214 can select the associated touch element.

If the input is determined to be ambiguous as to the selection of one of the touch elements, the magnification module 218 is utilized to magnify a region of interest of the touch screen 210. The region may include the touch elements. These touch elements can be the touch elements that may be associated with the touch input. Further, the magnified region can maintain a scaled spatial orientation of the region. The magnification module 218 can zoom in on the region by a particular scale (e.g., a predefined scale, a scale dynamically determined, etc.). A dynamic scale can be determined based on spacing information between touch elements, the size of the touch elements, the size of a blot associated with the touch input, or combinations thereof. Moreover, the magnification can be based on a user profile.

In one embodiment, the magnification module determines a scaling of the magnification based on a blot area and sizing information about at least two of the touch elements. As such, the ambiguity module 216 determines a blot area associated with the touch input. Further, the ambiguity module 216 can determine that the blot area covers at least two of the touch elements. The ambiguity module 216 can then determine sizing information about the at least two touch elements. This sizing information and the information describing the blot area can be utilized to dynamically determine the scale.

Once the magnified region is presented, the user may utilize that area as a user interface. As such, the user can select the intended touch element. The input detection module 212 then detects another touch input via the touch screen 210 in the magnified area. This input is then provided to the selection module 214 and/or ambiguity module 216. The ambiguity module 216 can process the information and determine whether the other touch input is ambiguous. If the other touch input is determined to be ambiguous, the magnification module 218 can be utilized to further magnify another region of interest in the magnified region. If the other touch input is determined to be unambiguous, the selection module 214 selects a touch element based on the other touch input. The original touch input and the other touch input can be a direct touch of at least one of the touch elements. As such, the user may utilize the same approach of selecting the selected touch element. This approach is simple and intuitive. Once the selection is complete, the magnification module 218 can de-magnify the region and a task associated with the selection can be performed.

In certain scenarios, an input device 240 can include a sensor, a keyboard, a mouse, a remote, a keypad, a microphone, or the like. Sensors can be used to implement various technologies, such as infrared technology, camera technology, touch screen technology, etc. Further, the device 200b may include devices utilized for input and output (not shown), such as a networking interface (e.g., Ethernet), a Universal Serial Bus (USB) connection, etc.

The input/output interfaces 234 can additionally be utilized to drive output to an output device 242. One of the modules 212-218, the processor 230, or another component of the device 200b can be utilized to send a signal via the input/output interfaces 234 to output devices 242. Examples of output devices include speakers, other display devices, amplifiers, etc.

In one embodiment, the ambiguity module 216 determines a blot area associated with the original touch input. The touch elements in this scenario can be associated with a drawing tool that includes a pointer that is smaller than the blot area. This may be utilized in a painting tool or pencil tool used by the user. In this scenario, a user profile, an application profile associated with the drawing tool, or other information can be processed to determine a magnification level to magnify a region of interest based on the original touch input. In one example, the magnification module 218 magnifies the region to a level where the pointer is within a threshold ratio of the blot area. With this approach, if the pointer (e.g., a paint brush or pencil end) is within a certain percentage of the size of the blot area, other determinations can be made by the processor 230 to determine which touch element to select. For example, the touch element to select can be in the center of the blot area created.

Figure 3:
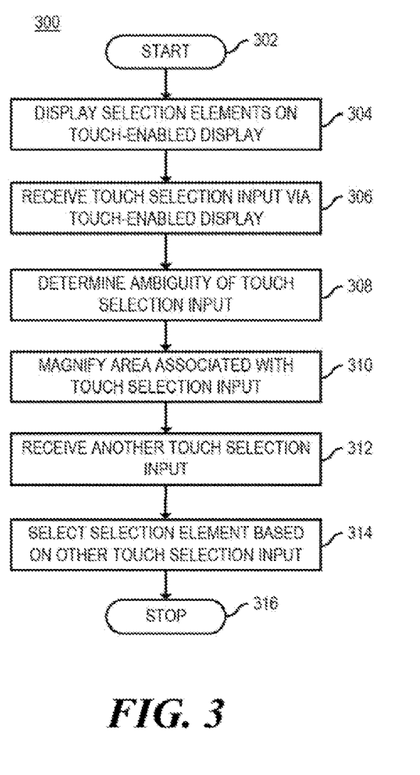
FIG. 3 is a flowchart of a method for selecting user interface elements, according to one example.

FIG. 3 is a flowchart of a method for selecting user interface elements, according to one example. Although execution of method 300 is described below with reference to device 200b, other suitable components for execution of method 300 can be utilized (e.g., computing device 100, device 200a, etc.). Additionally, the components for executing the method 300 may be spread among multiple devices. Method 300 may be implemented in the form of executable instructions stored on a machine-readable storage medium, such as storage medium 120, and/or in the form of electronic circuitry.

Method 300 may start at 302 and proceed to 304, where device 200 may display a plurality of selection elements on a touch-enabled display such as the touch screen 210. In certain embodiments, a selection element is a user interface element that may be chosen or activated by an input. By way of example, a selection element can be a link, a text input box, a soft key, a list, menu items on a tool bar, drawing space to be utilized by a drawing tool, a content box, a search box, or the like. Example user interfaces and selection elements are provided in FIGS. 7A-7F and FIGS. 8A-8C.

A user may then touch the touch-enabled display to select one of the selection elements. The input detection module 212 receives a touch selection input via the touch-enabled display (306). The input detection module 212 can then determine where the touch selection input is located, for example, by associating one or more coordinates with the touch selection input.

Then, at 308, the ambiguity module 216 determines whether the touch selection is ambiguous. The touch selection input can be considered ambiguous if the touch selection input is not clear as to selecting a selection element. As noted above, this can occur if it is determined that more than one selection element may be selected by the input. If there is no ambiguity and only one selection element is chosen, the element can be selected and tasks can be processed based on the selection.

If the touch selection input is determined to be ambiguous, then the method 300 proceeds to 310, where the magnification module 218 magnifies an area associated with the touch selection input. Magnification can be considered a direct magnification and equal scaling of the image presented at the display. The area can include, at least in part, the selection elements. The area includes a set of the selection elements associated with the ambiguity determination, that is, the selection elements that may be selected by the touch input. In certain scenarios, the set may be considered the selection elements that may be associated with the input, which cause the ambiguity. Further, the magnification of the area can maintain the spatial orientation of the area. As such, the scaling during the magnification is equal for the spaces between selection elements as well as the magnification of the selection elements. The magnification of the area can further be presented on a full screen area of the touch-enabled display or a portion of the display. For example, a portion of the display can be viewed as a callout from the location of the touch selection input.

Once the magnified area is displayed, a user can intuitively touch the magnified area to select the user's desired selection element via the display. As such, at 312, the input detection module 212 receives another touch selection input at the area via the touch-enabled display. The input detection module 212 then determines where the other input is located, for example, by associating one or more coordinates with the other input. Further, the original touch selection input and the other touch selection input can correspond to a direct touch of at least one of the selection elements.

At 314, the selection module 214 selects one of the selection elements based on the other touch input to the magnified area. In certain scenarios, the ambiguity module 216 can determine whether the selection of the one selection element is ambiguous. If the selection is ambiguous, the processes of FIG. 6 can be utilized to generate an unambiguous selection. If the selection is unambiguous, a task associated with the selection element can be performed. Then, at 316, the method 300 stops.

Figure 4:
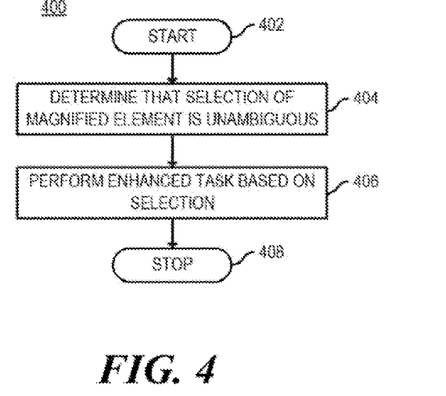
FIG. 4 is a flowchart of a method for performing enhanced tasks via magnified user interface area, according to one example.

FIG. 4 is a flowchart of a method for performing enhanced tasks via magnified user interface area, according to one example. Although execution of method 400 is described below with reference to device 200b, other suitable components for execution of method 400 can be utilized (e.g., computing device 100, device 200a, etc.). Additionally, the components for executing the method 400 may be spread among multiple devices. Moreover, method 400 may be implemented in the form of executable instructions stored on a machine-readable storage medium, such as storage medium 120, and/or in the form of electronic circuitry.

Method 400 may begin after a magnified area is presented to a user and the device 200b receives another input at the magnified area. Method 400 may start at 402 and proceed to 404, where device 200b determines that a selection of a selection element is unambiguous. The determination can be made using various methods, for example, determining a confidence level that the input is associated with the selection element. If the determined confidence level meets a predetermined threshold confidence level, the selection element can be determined to be unambiguous. In other scenarios, other criteria can be utilized in determining the ambiguity of the selection.

At 406, an enhanced task is performed based on the selection 406. In one example, the enhanced task is to perform an action associated with the selection element and de-magnifying the magnified area to the area. The demagnification can occur before or after the task is completed.

In one example, activation of a list can be a task to perform based on the selection of the magnified selection element. Instead of performing the opening of the list in the magnified area, the area can be de-magnified and then the opened list can be presented. In this manner, the user can view the opened list in the scaling that the user was originally viewing. An example of opening a list is described below in the discussion of FIG. 7E.

In another example, the task can be to execute a link to a webpage. In this example, the enhanced task can include saving a de-magnified version of the original user interface to a memory and then executing the link. The link can be presented without magnification. Further, if the user utilizes a back selection element to move back to the original user interface, the saved de-magnified version of the user original user interface can be presented. Then, at 408, the method 400 stops.

Figure 5:
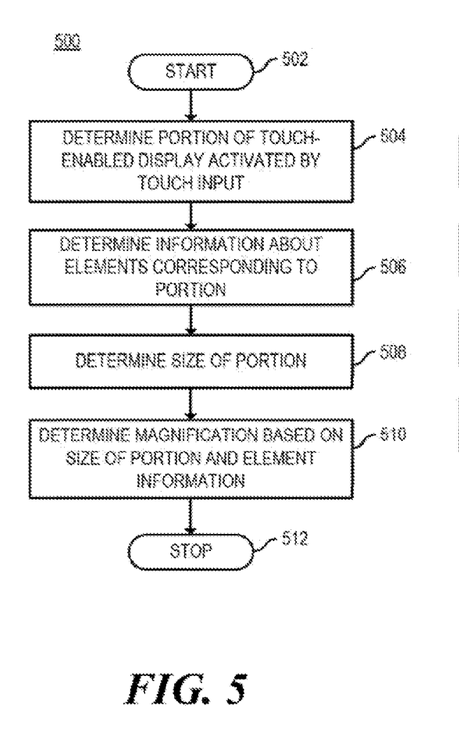
FIG. 5 is a flowchart of a method for determining a magnification level of an area associated with a touch selection input, according to one example.

FIG. 5 is a flowchart of a method for determining a magnification level of an area associated with a touch selection input, according to one example. Although execution of method 500 is described below with reference to computing device 100, other suitable components for execution of method 500 can be utilized (e.g., device 200a, device 200b, etc.). Additionally, the components for executing the method 500 may be spread among multiple devices. Method 500 may be implemented in the form of executable instructions stored on a machine-readable storage medium, such as storage medium 120, and/or in the form of electronic circuitry.

Method 500 can occur after a touch input is received and determined to be ambiguous. Method 500 may start at 502 and proceed to 504, where computing device 100 may determine a portion of the touch-enabled display activated by the touch selection input. The portion can be, for example, a blot area. Further, the portion can be associated with coordinates of the display.

Then, at 506, the computing device can determine information about selection elements corresponding to the portion. For example, these selection elements can be a set of elements that may be determined to cause the ambiguity because more than one of the selection elements may be the desired target of the user. The information can include sizing information about the selection elements. Further, the information can include spacing information associated with the selection elements. At 508, a size of the portion can be determined. The size of the portion and/or selection elements can be associated with a length, width, radius, area, or the like associated with the elements.

Then, at 510, the computing device 100 can determine a magnification level based on the size of the portion, the sizing information, the spacing information, or a combination thereof. For example, the magnification can be to a level such that the size of the portion (e.g., blot area) is at least a certain percentage of the size of one or more particular elements. In another example, the size of the one or more particular elements as well as the space size between elements can be compared to the portion to determine the magnification level. The magnification level can be optimized in such a manner that the size of the particular elements and/or the size of the space between elements can be used so that another input the size of the portion can be used to uniquely activate one of the elements. In some scenarios, blot area size information used in the calculation can be determined from a user profile or other collected information. The method 500 then proceeds to 512, where the method 500 stops.

Figure 6:
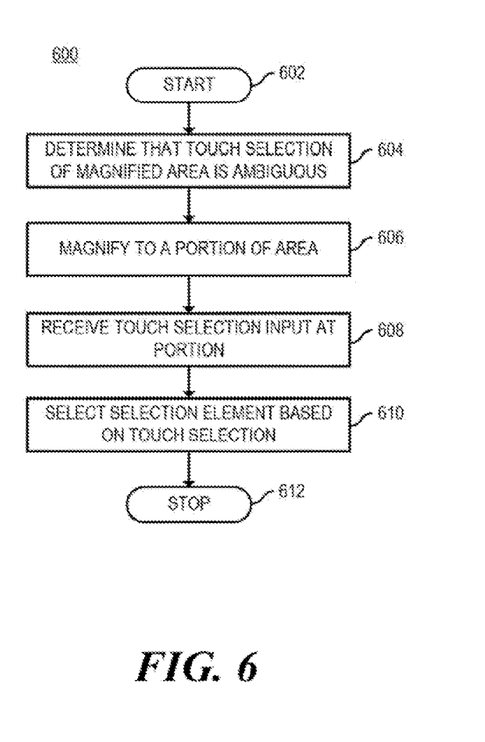
FIG. 6 is a flowchart of a method for incrementally magnifying a user interface area to determine a touch selection input, according to one example.

FIG. 6 is a flowchart of a method for incrementally magnifying a user interface area to determine a touch selection input, according to one example. Although execution of method 600 is described below with reference to device 200b, other suitable components for execution of method 600 can be utilized (e.g., device 200a, computing device 100, etc.). Additionally, the components for executing the method 600 may be spread among multiple devices. Method 600 may be implemented in the form of executable instructions stored on a machine-readable storage medium, such as storage medium 120, and/or in the form of electronic circuitry.

Method 600 may start in 602, where device 200b can be at a state (e.g., at 310 or 312 of method 300) in which a user interface is magnified to an area in response to a received ambiguous touch selection input. Another touch selection input is received to select one of a plurality of selection elements presented in the area. The method 600 can then proceed to 604, where device 200b is caused to determine that the other touch selection input is ambiguous in selecting the one selection element.

At 606, based on the ambiguity determination, the magnification module 218 further magnifies the user interface to a portion of the magnified area based on the other touch selection input received. The portion can be a region nearby a blot area caused by the other touch selection input. Further, the portion can include the touch selection elements that were the cause of the ambiguity determination. As such, the portion can include the one selection element and other selection elements that are within range of the touch selection input. The inclusion of the selection elements can include partial selection elements. As such, to include a selection element in the magnified portion means to include at least a selectable part of the selection element. The entire selection element may also be included.

The user can view the magnified portion to select the one selection element. As such, the device 200b receives a third touch selection input (at 608). This input can be via the touch screen 210 and be at the magnified portion. The selection module 214 can select the one selection element by associating the third touch selection input with the one selection element (at 610). As such, the selection of the one touch selection element can be based, at least in part, on the third touch selection input. The method 600 can repeat anytime a touch selection input is deemed to be ambiguous. Then, at 612, the method 600 stops.

FIGS. 7A-7F are block diagrams of example user interfaces for touch screen selection via auto magnification, according to various examples. The user interfaces can be associated with a device. User interface 700 shows multiple touch elements 702a, 702b, 702c, 704 as well as other user interface components. For example, picture 706 may be presented, but not be selectable.

A user of the device can attempt to select, via a touch-enabled display, one of the touch elements. Here, the touch is represented by a blot area 718. The blot area looks like a circle in FIG. 7B, however, the blot area 718 can be represented by one or more points, a shape like the circle, or another representation. Further, the blot area need not be presented to a user. Because the blot area 718 could be associated with Item A 702a or Item B 702b, the blot area 718 can be considered ambiguous. A magnification module of the device magnifies an area associated with the selection to allow for an unambiguous selection.

User interface 720 of FIG. 7 shows a magnified region of interest based on the ambiguity decision and the blot area 718. Item A 722a, Item B 722b, and Item C 722c are displayed in the magnified region. The user can then enter another touch input to select one of the items unambiguously. User interface 730 of FIG. 7D shows a blot area 738 associated with the touch input. The blot area 738 unambiguously selects item B 722b. The selection of Item B 722b triggers an activation of a task associated with Item B 722b.

Figure 7A:
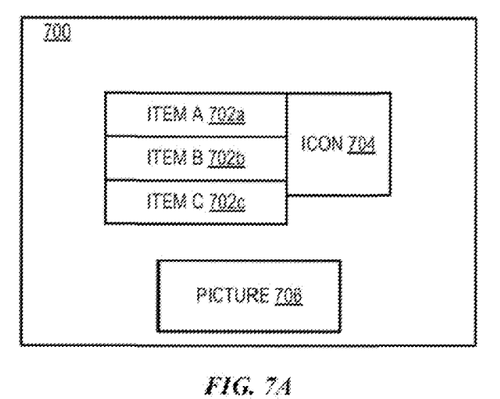
FIGS. 7A-7F are block diagrams of example user interfaces for touch screen selection via auto magnification, according to various examples.
Figure 7B:
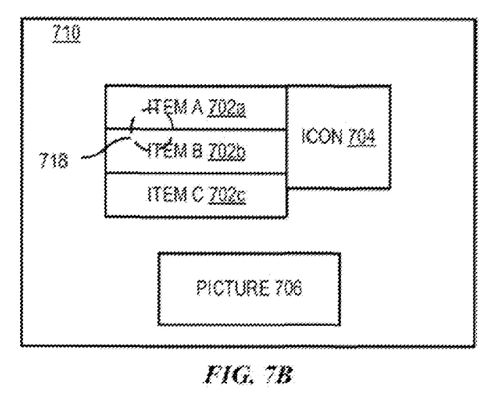
Figure 7C:
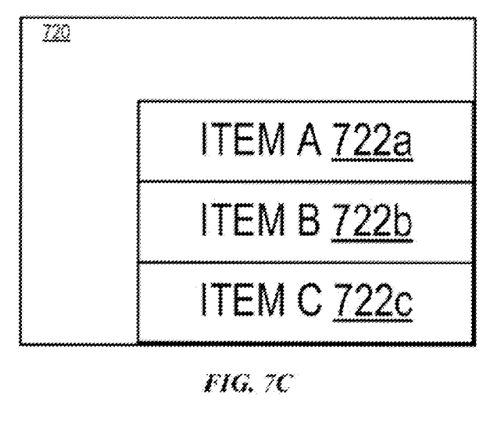
Figure 7D:
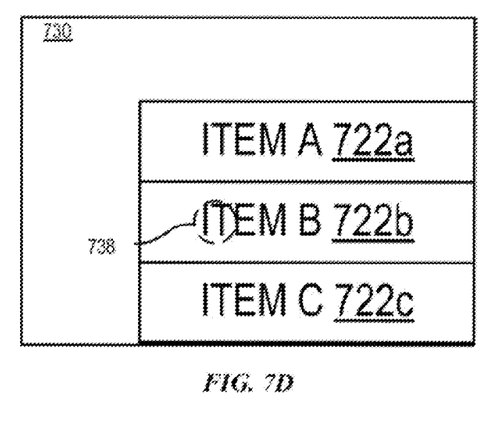
Figure 7E:
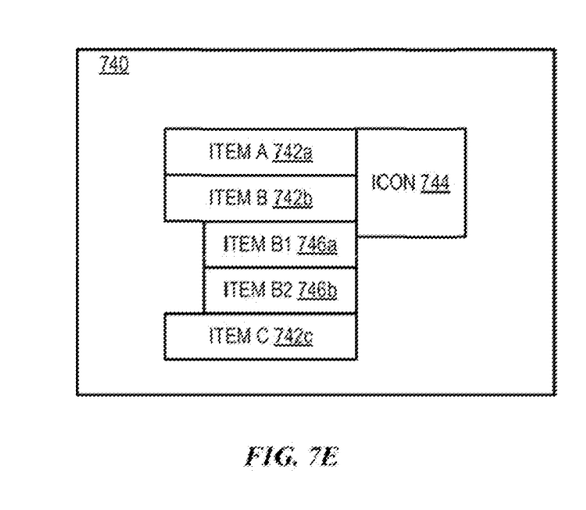

The user interface 740 of FIG. 7E shows Items A-C 742a-742c as well as icon 744 and Items B1 746a and B2 746b. The user interface no longer includes the magnification and can automatically go back to the previous state before the activation of the task. In this scenario, the task includes the presentation of Items B1 746a and B2 746b. In certain scenarios, the task can be performed simultaneously with the demagnification and/or before the demagnification.

Figure 7F:
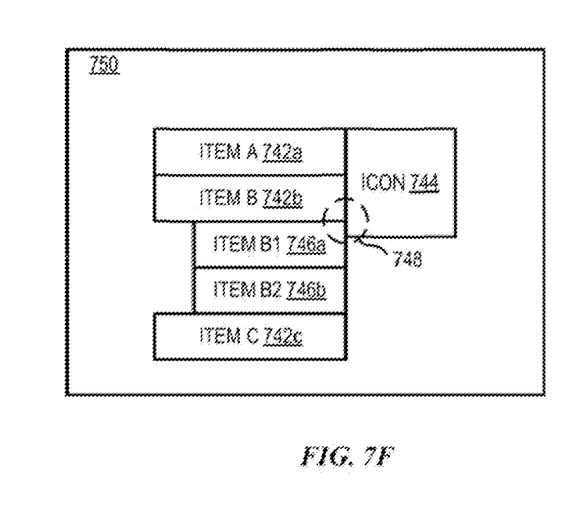

FIG. 7F includes user interface 750 which shows the Items 742a-742c, 746a, 746b as well as the icon 744. Here, another touch input is detected. Another blot area 748 is determined in associated with the touch input. In this case, the device can determine that the selection of touch elements is ambiguous. In one example, the icon 744 is not a touch element. As such, a magnification of the touch elements can focus on Item B 742b and Item B1 746a. In another example, the icon 744 is a touch element. In this example, the icon 744 can be a focus of the magnified area.

Figure 8A:
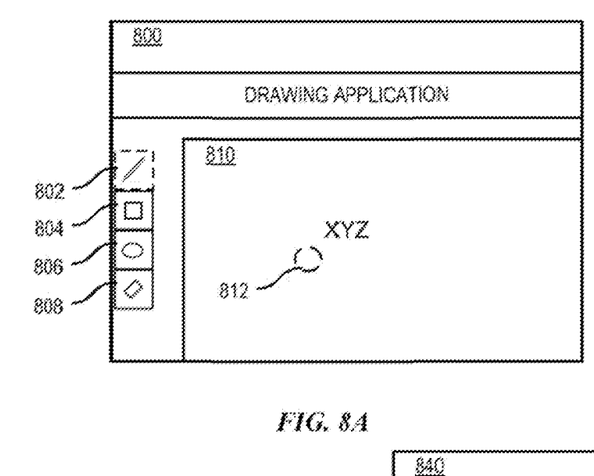
FIGS. 8A-8C are block diagrams of example user interfaces for touch screen selection via auto magnification, according to various examples.
Figure 8B:
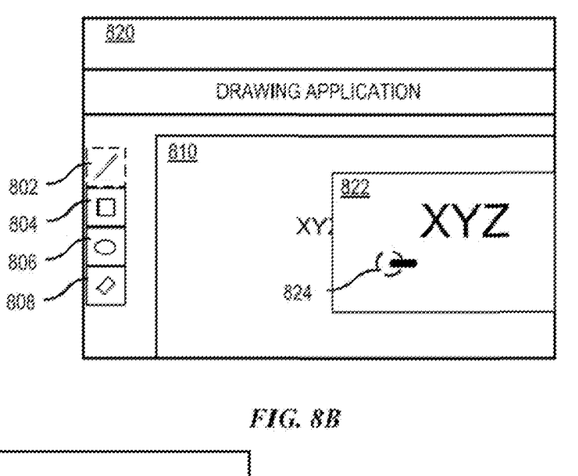
Figure 8C:
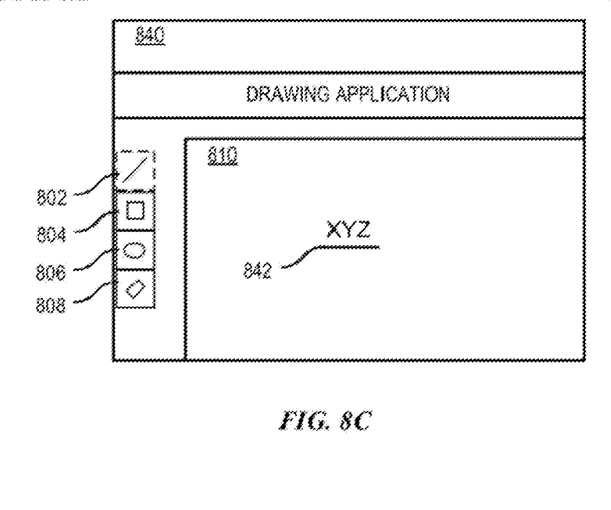

FIGS. 8A-8C are block diagrams of example user interfaces for touch screen selection via auto magnification, according to various examples. User interface 800 of FIG. 8A shows a drawing application including a toolbar on the left. The toolbar can include a pencil tool 802, a rectangle tool 804, an ellipse tool 806, and an eraser tool 808. The pencil tool 802 is selected. A drawing area 808 is presented in the user interface 800. A user can touch the drawing area 810 to draw utilizing the selected pencil tool 802. A blot area 812 associated with the touch is shown.

The drawing application can receive the input and determine that area the user wishes to draw to is ambiguous because of the available options of pixel space to use the pencil tool on in the blot area 812. As such, FIG. 8B shows user interface 820 that includes a magnified region 822 to allow for unambiguous drawing using the tool. The ambiguity can be determined based on a ratio of the size of a blot area 824 of another touch to the size of a tip of the pencil tool. As such, the user can draw using the pencil tool in the magnified area 822. When the user is done (e.g., determined by letting go of the touch used to generate the drawing) the magnified area 822 is returned to its previous state, as shown in user interface 840 of FIG. 8C. The drawing 842 can also be added to the drawing area 810. The use of other tools, for example, the eraser tool 808, may not invoke a magnification. This can be because the eraser tool has a sufficiently big pointer that when in use the user touches are determined to be unambiguous. As previously noted, the ambiguity determination can be based on many factors.

What is claimed is:

1. A method comprising:
   displaying a plurality of selection elements on a touch-enabled display;
   receiving a first touch selection input via the touch-enabled display;
   determining an ambiguity based on the first touch selection input;
   magnifying a region associated with the first touch selection input based on the ambiguity determination, wherein the region includes a set of the selection elements associated with the ambiguity determination;
   determining a blot area of the touch-enabled display activated by the first touch selection input, the blot area having a size smaller than a size of each selection element of the selection elements in the set, and the size of the blot area defined by a user profile;
   determining sizing information about the selection elements in the set that correspond to the blot area, wherein the magnifying of the region is determined based on a size of the blot area and the sizing information about the selection elements in the set, and the magnifying increases a size of a first selection element of the selection elements in the set to be at least a specified percentage of the size of the blot area;
   receiving a second touch selection input at the magnified region via the touch-enabled display; and
   selecting one of the selection elements in the set based on the second touch selection input.

2. The method of claim 1, wherein the first touch selection input and the second touch selection input correspond to direct touches of at least one of the plurality of selection elements.

3. The method of claim 1, wherein the magnifying of the region maintains a scaled spatial orientation of the region.

4. The method of claim 1, wherein the magnifying of the region displays the region to a full screen of the touch-enabled display.

5. The method of claim 1, further comprising:
   determining that the second touch selection input is unambiguous; and
   de-magnifying the magnified region.

6. The method of claim 1, wherein the plurality of selection elements include at least one of: a link, a soft key, a drawing tool, a content box, and a search box.

7. The method of claim 1, further comprising:
   determining that the second touch selection input is ambiguous in selecting one of the selection elements in the set;
   further magnifying to a further portion of the magnified region based on the second touch selection input; and
   receiving a third touch selection input at the further portion,
   wherein selecting the one selection element is further based on the third touch selection input.

8. The method of claim 1, wherein increasing the size of the first selection element as part of the magnifying of the region comprises increasing the size of a smallest selection element of the selection elements in the set.

9. The method of claim 1, wherein the first selection element has a first relative size to the size of the blot area prior to the magnifying, and the first selection element has a second, larger relative size to the size of the blot area after the magnifying.

10. A device comprising:
    a processor;
    a touch screen to display a plurality of touch elements;
    a non-transitory storage medium storing instructions executable on the processor to:
    detect a touch input via the touch screen;
    determine that a first touch input is ambiguous in selecting one of the touch elements;
    magnify a region of interest of the touch screen associated with the first touch input, wherein the region includes a set of the touch elements;
    determine a blot area associated with the first touch input, the blot area having a size smaller than a size of each selection element of the selection elements in the set, and the size of the blot area defined by a user profile;
    determine sizing information about the touch elements in the set;
    determine a scaling of the magnifying of the region based on the blot area and the sizing information about the touch elements in the set, the magnifying increasing a size of a first selection element of the selection elements in the set to be at least a specified percentage of a size of the blot area;
    receive a second touch input at the magnified region; and
    select one of the selection elements in the set based on the second touch input.

11. The device of claim 10, wherein the first touch input and the second touch input are direct touches of at least one of the plurality of touch elements.

12. The device of claim 10, wherein the plurality of touch elements are associated with a drawing tool that includes a pointer that is smaller than the blot area, and wherein the magnifying magnifies the region to a level where the pointer is within a threshold ratio of the blot area.

13. The device of claim 10, wherein the first selection element is a smallest selection element of the selection elements in the set.

14. The device of claim 10, wherein the first selection element has a first relative size to the size of the blot area prior to the magnifying, and the first selection element has a second, larger relative size to the size of the blot area after the magnifying.

15. A non-transitory machine-readable storage medium storing instructions that, when executed, cause a device to:
    cause display of a plurality of touch elements on a touch-enabled display;
    determine a blot area associated with a first touch input received via the touch-enabled display, the blot area having a size smaller than a size of each selection element of the plurality of selection elements, and the size of the blot area defined by a user profile;
    determine ambiguity in the first touch input selecting one of the touch elements;

magnify a region of interest surrounding the blot area in response to determining the ambiguity, wherein the magnified region maintains a scaled spacing of the region;

determine a set of the touch elements that may be selected based on the blot area;

determine sizing information of the touch elements in the set, wherein a scale for the magnifying is based on a size of the blot area and the sizing information, and the magnifying increases a size of a first selection element of the touch elements in the set to be at least a specified percentage of the size of the blot area;

determine a second blot area associated with a second touch input received in the magnified region via the touch-enabled display; and determine selection of one of the touch elements in the set based on the second blot area.

16. The non-transitory machine-readable storage medium of claim 15, wherein the magnifying is further based on the user profile.

17. The non-transitory machine-readable storage medium of claim 15, wherein the first selection element is a smallest selection element of the selection elements in the set.

18. The non-transitory machine-readable storage medium of claim 17, wherein the first selection element has a first relative size to the size of the blot area prior to the magnifying, and the first selection element has a second, larger relative size to the size of the blot area after the magnifying.

* * * * *